United States Patent
Sato

(10) Patent No.: US 12,025,556 B2
(45) Date of Patent: Jul. 2, 2024

(54) OPTICAL PROPERTY MEASUREMENT METHOD AND OPTICAL PROPERTY CALCULATION APPARATUS

(71) Applicant: OLYMPUS CORPORATION, Tokyo (JP)

(72) Inventor: Tomoko Sato, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 327 days.

(21) Appl. No.: 17/540,585

(22) Filed: Dec. 2, 2021

(65) Prior Publication Data

US 2022/0091034 A1     Mar. 24, 2022

Related U.S. Application Data

(63) Continuation of application No. PCT/JP2019/028893, filed on Jul. 23, 2019.

(51) Int. Cl.
    *G01N 21/47*     (2006.01)

(52) U.S. Cl.
    CPC ..... *G01N 21/47* (2013.01); *G01N 2021/4711* (2013.01)

(58) Field of Classification Search
    CPC ........... G01N 21/47; G01N 2021/4711; G01N 2021/1744; G01N 21/27; G01N 21/474; G01N 21/49; G01N 21/45
    USPC ....................................................... 356/446
    See application file for complete search history.

(56) References Cited

U.S. PATENT DOCUMENTS

| | | | |
|---|---|---|---|
| 2004/0092824 | A1 | 5/2004 | Stamnes et al. |
| 2005/0002031 | A1 | 1/2005 | Kraemer et al. |
| 2008/0194929 | A1 | 8/2008 | Pesach et al. |
| 2010/0094561 | A1 | 4/2010 | Masumura |

(Continued)

FOREIGN PATENT DOCUMENTS

| | | | |
|---|---|---|---|
| JP | 2000-266669 | A | 9/2000 |
| JP | 2006-521869 | A | 9/2006 |

(Continued)

OTHER PUBLICATIONS

International Search Report dated Aug. 27, 2019 received in PCT/JP2019/028893.

(Continued)

*Primary Examiner* — Md M Rahman
(74) *Attorney, Agent, or Firm* — Scully, Scott, Murphy & Presser, P.C.

(57) ABSTRACT

An optical property measurement method includes: measuring, by first measurement, optical intensity of backscattering from a measurement target object when light is beamed to the measurement target object; calculating an attenuation coefficient in a depth direction of the measurement target object based on a measurement result of the first measurement; measuring, by second measurement that is different from the first measurement, optical intensity of backscattering from the measurement target object when light is beamed to the measurement target object; and calculating a scattering coefficient and an absorption coefficient in the depth direction of the measurement target object based on a measurement result of the second measurement by using a value of the calculated attenuation coefficient as a limiting condition.

11 Claims, 4 Drawing Sheets

(56) References Cited

U.S. PATENT DOCUMENTS

| | | |
|---|---|---|
| 2011/0098575 A1 | 4/2011 | Stamnes et al. |
| 2014/0180131 A1* | 6/2014 | Kamimura ............ A61B 1/0669 600/476 |
| 2015/0029821 A1* | 1/2015 | Miyaki ............... G01S 7/52036 367/7 |
| 2019/0110720 A1 | 4/2019 | Shimizu et al. |
| 2019/0125247 A1 | 5/2019 | Saeki et al. |
| 2019/0246906 A1* | 8/2019 | Nakamura ......... G01N 21/4795 |

FOREIGN PATENT DOCUMENTS

| | | |
|---|---|---|
| JP | 4038179 B2 | 1/2008 |
| JP | 2010-088498 A | 4/2010 |
| JP | 4995055 B2 | 8/2012 |
| JP | 2014-128487 A | 7/2014 |
| JP | 5783564 B2 * | 9/2015 |
| JP | 2017-225811 A | 12/2017 |
| JP | 2018-115939 A | 7/2018 |
| JP | 2018115939 A * | 7/2018 |
| WO | 2014/087825 A1 | 6/2014 |

OTHER PUBLICATIONS

Andreas H. Hielscher, et al., "Influence of particle size and concentration on the diffuse backscattering of polarized light from tissue phantoms and biological cell suspensions" vol. 36, No. 1, Applied Optics.

Ji Yi, et al., "Spatially resolved optical and ultrastructural properties of colorectal and pancreatic field carcinogenesis observed by inverse spectroscopic optical coherence tomography," vol. 19(3), 036013, Journal of Biomedical Optics.

* cited by examiner

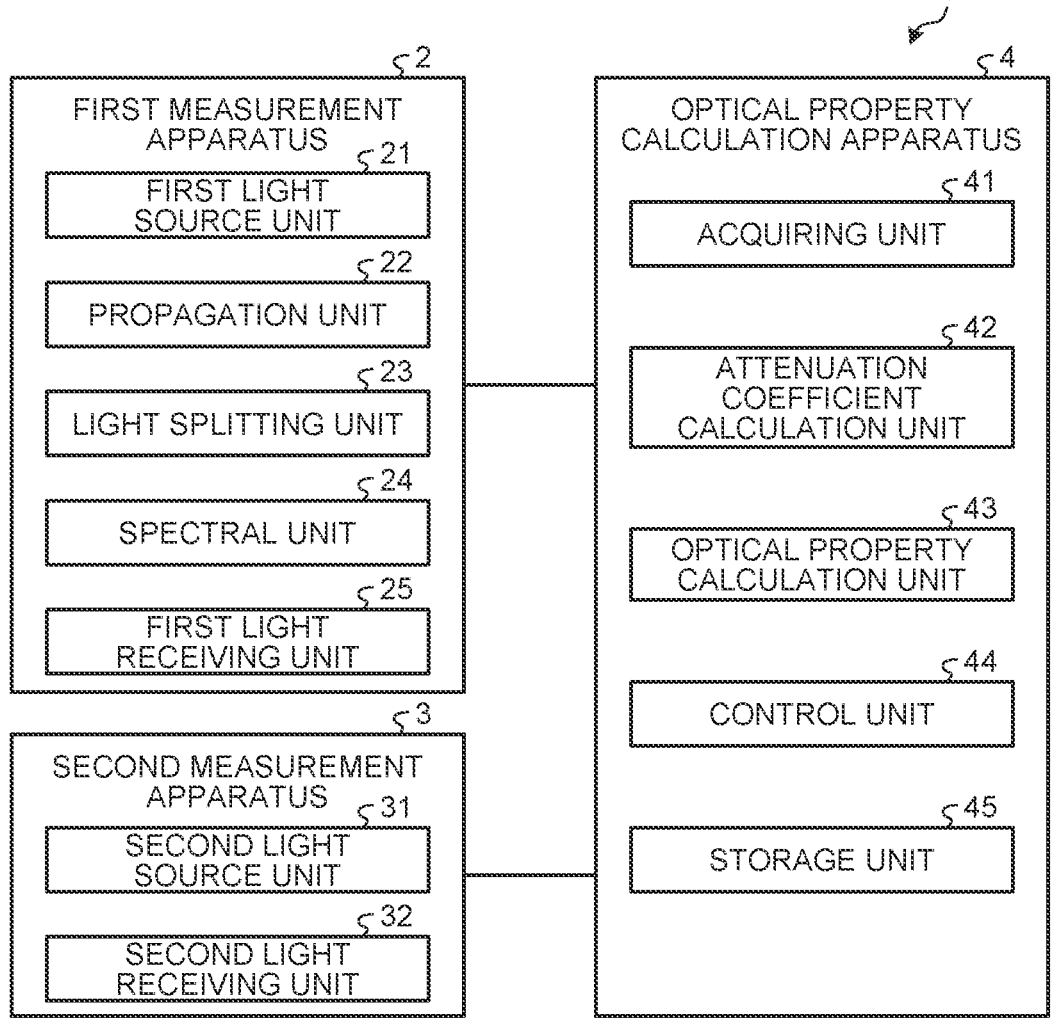
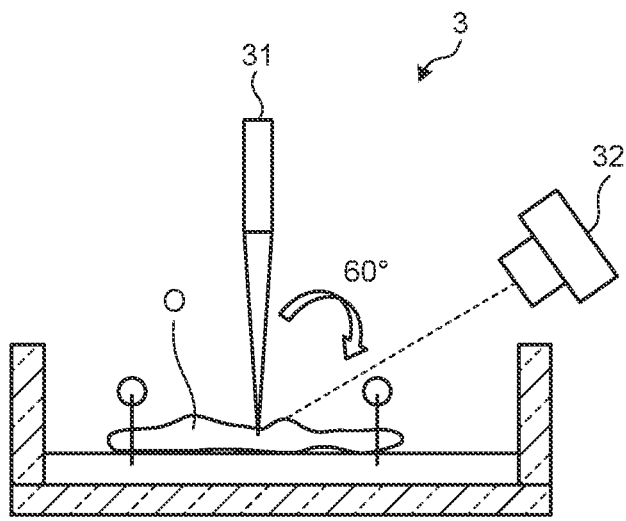

OPTICAL PROPERTY MEASUREMENT METHOD AND OPTICAL PROPERTY CALCULATION APPARATUS

CROSS-REFERENCE TO RELATED APPLICATION

This application is a continuation of International Application. No. PCT/JP2019/028893, filed on Jul. 23, 2019, the entire contents of which are incorporated herein by reference.

BACKGROUND

1. Technical Field

The present disclosure relates to an optical property measurement method and an optical property calculation apparatus.

2. Related Art

A technology for beaming light to a measurement target object, such as a biological tissue, that is a volume scattering object and measuring optical intensity of backscattering from the measurement target object at a plurality of different angles and positions to estimate an optical property distribution inside the measurement target object has been known.

Japanese Patent No. 4995055 discloses a technology for performing measurement while changing an angle at which light is applied to a measurement target object and changing an angle at which backscattering from the measurement target object is received, and estimating a scattering coefficient and an absorption coefficient inside the measurement target object by using the radiative transfer equation (RTE) and a look-up table.

Japanese Patent No. 4038179 discloses a technology for receiving backscattering from a measurement target object at different positions using a plurality of optical fibers and estimating a scattering coefficient and an absorption coefficient inside the measurement target object by using the Monte Carlo method.

In the technologies disclosed in Japanese Patent No. 4995055 and Japanese Patent No. 4038179, it is possible to improve estimation accuracy of the optical property inside the measurement target object by increasing an amount of information by increasing the number of angles and positions at which the optical intensity of the backscattering from the measurement target object is measured.

SUMMARY

In some embodiments, an optical property measurement method includes: measuring, by first measurement, optical intensity of backscattering from a measurement target object when light is beamed to the measurement target object; calculating an attenuation coefficient in a depth direction of the measurement target object based on a measurement result of the first measurement; measuring, by second measurement that is different from the first measurement, optical intensity of backscattering from the measurement target object when light is beamed to the measurement target object; and calculating a scattering coefficient and an absorption coefficient in the depth direction of the measurement target object based on a measurement result of the second measurement by using a value of the calculated attenuation coefficient as a limiting condition.

In some embodiments, an optical property calculation apparatus includes a processor including hardware. The processor is configured to: acquire a measurement result of a first measurement apparatus configured to measure optical intensity of backscattering from a measurement target object when light is beamed to the measurement target object, and a measurement result of a second measurement apparatus configured to measure, by a different measurement method from a method used by the first measurement apparatus, optical intensity of backscattering from the measurement target object when light beamed to the measurement target object; calculate an attenuation coefficient in a depth direction of the measurement target object based on the measurement result of the first measurement apparatus; and calculate a scattering coefficient and an absorption coefficient in the depth direction of the measurement target object based on the measurement result of the second measurement apparatus by using a value of the calculated attenuation coefficient as a limiting condition.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 1 is a schematic diagram illustrating a configuration of an optical property measurement system including an optical property calculation apparatus according to one embodiment of the present disclosure;

FIG. 2 is a schematic diagram illustrating a configuration of a second measurement apparatus;

DETAILED DESCRIPTION

Figure 3:
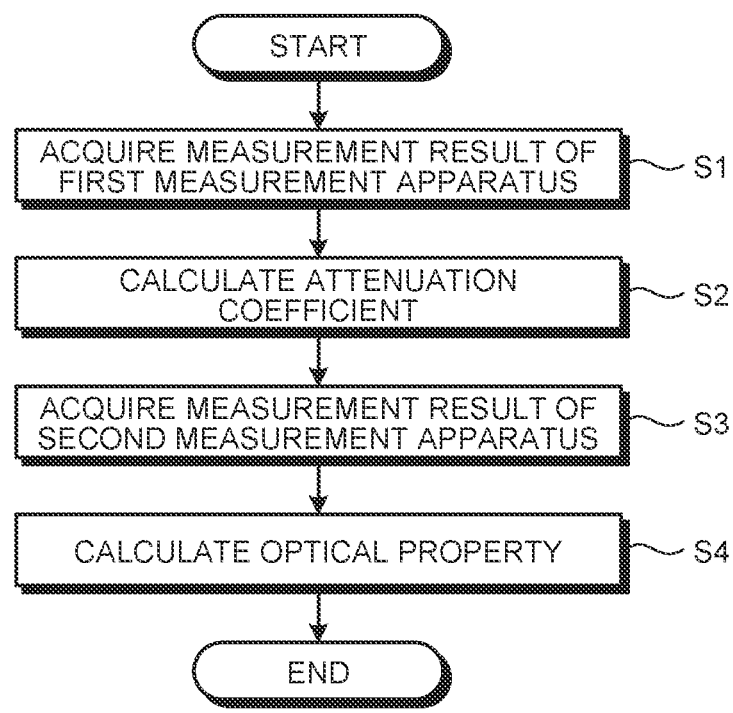
FIG. 3 is a flowchart illustrating an outline of a process performed by the optical property calculation apparatus illustrated in FIG. 1.

Embodiments of an optical property measurement method and an optical property calculation apparatus according to the present disclosure will be described below with reference to the drawings. The present disclosure is not limited by the embodiments below. The present disclosure is applicable to a general optical property measurement method and a general optical property calculation apparatus for measuring a scattering coefficient and an absorption coefficient.

Further, in the description of the drawings, the same or corresponding components are denoted by the same reference symbols appropriately. Furthermore, it is necessary to note that the drawings are schematic, and dimensional relations among the components, ratios among the components, and the like may be different from the actual ones. Moreover, the drawings may include portions that have different, dimensional relations or ratios.

Embodiment

Configuration of Optical Property Measurement System

A configuration of an optical property measurement system according to one embodiment will be described below. FIG. 1 is a schematic diagram illustrating a configuration of an optical property measurement system including an optical property calculation apparatus according to one embodiment of the present disclosure. As illustrated in FIG. 1, an optical property measurement system 1 according to the present embodiment includes a first measurement apparatus 2, a second measurement apparatus 3, and an optical property calculation apparatus 4 that calculates an optical property inside a measurement target object on the basis of measurement results obtained by the first measurement apparatus 2 and the second measurement apparatus 3. Meanwhile, the measurement target object is, for example, a living body, but may be a pseudo living body (what is called a phantom) or the like, and is not specifically limited.

Configuration of First Measurement Apparatus

A configuration of the first measurement apparatus will be described below. The first measurement apparatus 2 light to a measurement target object and measures optical intensity of backscattering from the measurement target object. Specifically, the first measurement apparatus 2 measures an inner side of the measurement target object in, for example, a visible light range by an optical coherence tomography (OCT), but a wavelength band is not specifically limited. The first measurement apparatus 2 performs OCT measurement by spectral-domain (SD)-OCT, but may perform OCT measurement by time-domain (TD)-OCT.

The first measurement apparatus 2 includes a first light source unit 21 that emits light, a propagation unit 22 that causes the light emitted by the first light source unit 21 to propagate, a light splitting unit 23 that splits the light from the first light source unit 21 into measurement beam and reference beam, a spectral unit 24 that spectrally disperses interfering beam that is generated by the measurement beam and the reference beam that are backscattered in the subject, and a first light receiving unit 25 that receives the interfering beam split by the spectral unit 24. If the first measurement apparatus 2 performs OCT measurement in the visible light range, the first light source unit 21 to the first light receiving unit 25 are configured as units that function in the visible light range.

The first light source unit 21 is a light source for which a wavelength width and a central wavelength in the visible light range are freely selectable. Specifically, the first light source unit 21 is, for example, a supercontinuum light source. Light emitted by the first light source unit 21 is spot light that is beamed to a single point on a measurement target object O; however, it may be possible to beam the spot light while performing scanning in a horizontal direction with respect to the measurement target object O.

The propagation unit 22 causes the light emitted by the first light source unit 21 to propagate. The propagation unit 22 is an optical fiber for which a loss and dispersion in the visible light range are small, and is, for example, a photonic crystal fiber.

The beam splitting unit 23 is, for example, a half mirror, and, light that transmits through the beam splitting unit 23 serves as the measurement beam and beam that is reflected by the beam splitting unit 23 serves as the reference I beam.

The measurement beam that has transmitted through the beam splitting unit 23 enters the subject. Then, beam that is backscattered inside the object transmits through the beam splitting unit 23 again, and interfering beam of the transmitted beam and the reference beam enters the spectral unit 24.

The spectral unit 24 spectrally disperses the interfering beam. Examples of the spectral unit 24 include a diffraction grating and a prism, but the spectral unit 24 may have any configuration as long as it is possible to spectrally disperse light.

The first light receiving unit 25 outputs an electrical signal that is obtained by performing photoelectric conversion on incident light. The first light receiving unit 25 may be, for example, a single-pixel photodiode, but may be a line sensor or an area sensor with a plurality of pixels. If the first light receiving unit 25 is a single-pixel light receiving element, it is possible to obtain an OCT measurement result at each wavelength by causing the spectral unit 24 or the first light receiving unit 25 to move or rotate. Alternatively, it may be possible to obtain split light without a movable portion by using a sensor with a plurality of pixels. Furthermore, the first light receiving unit 25 may receive the measurement light by performing scanning in the horizontal direction with respect to the measurement target object O.

Configuration of Second Measurement Apparatus

A configuration of the second measurement apparatus will be described below. The second measurement apparatus 3 beams light to the measurement target object and measures optical intensity of backscattering from the measurement target object by a measurement method that is different from a method used by the first measurement apparatus 2. FIG. 2 is a schematic diagram illustrating the configuration of the second measurement apparatus. As illustrated in FIG. 2, the second measurement apparatus 3 includes a second light source unit 31 that beams spot light to the measurement target object O at an approximately vertical, and a second light receiving unit 32 that receives backscattering from the measurement target object O in a direction at, for example, an angle of 60 degrees with respect to a light incident direction. However, the angle at which the second light receiving unit 32 receives the backscattering is not specifically limited. The second light receiving unit 32 includes imaging elements that are arranged in two dimensions, and measures, on a front surface of the measurement target object O, an optical intensity distribution of the backscattering from the measurement target object O. Furthermore, the second light source unit 31 may beam spot light by performing scanning a plane perpendicular to the incident light on the measurement target object O. Similarly, the second light receiving unit 32 may receive the backscattering from the measurement target object O by performing scanning on the front surface of the measurement target object O.

Configuration of Optical Property Calculation Apparatus

A configuration of the optical property calculation apparatus will be described below. The optical property calculation apparatus 4 includes an acquiring unit 41 that acquires measurement results obtained by the first measurement apparatus 2 and the second measurement apparatus 3, an attenuation coefficient calculation unit 42 that calculates an attenuation coefficient on the basis of the measurement result obtained by the first measurement apparatus 2, an optical property calculation unit 43 that calculates a scattering coefficient and an absorption coefficient, a control unit 44 that comprehensively controls the entire optical property measurement system 1, and a storage unit 45 that stores therein various programs for controlling the optical property measurement system 1.

The acquiring unit 41 acquires the measurement results obtained by the first measurement apparatus 2 and the second measurement apparatus 3. The acquiring unit 41 is implemented by a central processing unit (CPU), various arithmetic circuits, or the like.

The attenuation coefficient calculation unit 42 calculates an attenuation coefficient in a depth direction of the measurement target object O on the basis of the measurement result of the first measurement apparatus 2. The attenuation coefficient calculation unit 42 is implemented by a CPU, various arithmetic circuits, or the like.

The optical property calculation unit 43 fixes the attenuation coefficient to a value calculated by the attenuation coefficient calculation unit 42, and calculates a scattering coefficient and an absorption coefficient in the depth direction of the measurement target object O on the basis of the measurement result of the second measurement apparatus 3 by using the fixed value as a limiting condition. The optical property calculation unit 43 is implemented by a CPU, various arithmetic circuits, or the like.

The control unit 44 comprehensively controls operation of the optical property measurement system 1 by transferring instructions, data, or the like to each of the units included in the optical property measurement system 1, for example. The control unit 44 is implemented by a CPU, various arithmetic circuits, or the like.

The storage unit 45 is implemented by a semiconductor memory, such as a hard disk and a random access memory (RAM). The storage unit 45 stores therein various programs to be executed by the optical property measurement system 1, the measurement results that are obtained by the first measurement apparatus 2 and the second measurement apparatus 3 and that are acquired by the acquiring unit 41, and the like.

Optical Property Measurement Method

An optical property measurement method using the optical property measurement system 1 will be described below. FIG. 3 is a flowchart illustrating an outline of a process performed by the optical property calculation apparatus 4 illustrated in FIG. 1. First, as illustrated in FIG. 3, the acquiring unit 41 acquires the measurement result of the first measurement apparatus 2 (Step S1). The measurement result acquired by the acquiring unit 41 includes an interference component of the measurement light and the reference light, and a non-interference component. Meanwhile, the first measurement apparatus 2 performs measurement before the process at Step S1 is performed.

Figure 4:
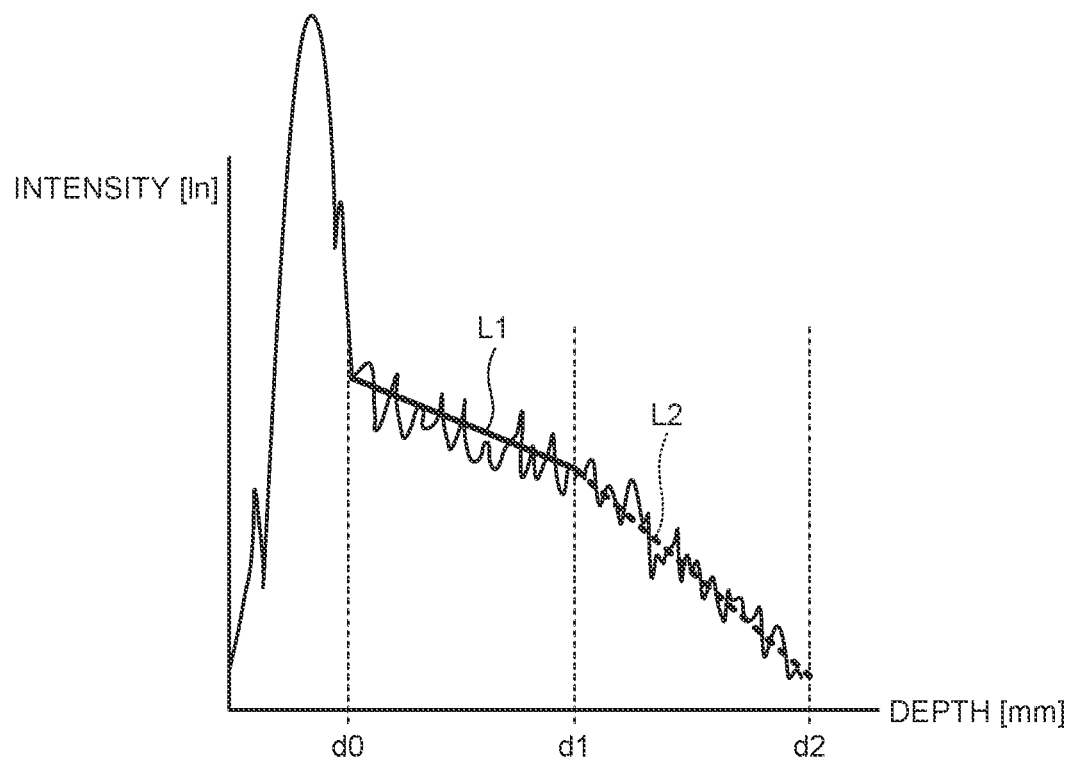
FIG. 4 is a diagram illustrating optical intensity of backscattering in a depth direction, which is measured by a first measurement apparatus.

Subsequently, the attenuation coefficient calculation unit 42 calculates an attenuation coefficient in the depth direction of the measurement target object O on the basis of the measurement result of the first measurement apparatus 2 (Step S2). The attenuation coefficient calculation unit 42 obtains only the interference component by subtracting a separately-measured non-interference component from the measurement result that is acquired by the acquiring unit 41. Furthermore, the attenuation coefficient calculation unit 42 calculates an optical intensity distribution of the backscattering in the depth direction of the measurement target object O by performing a Fourier transform on the interference component in a wavelength direction. FIG. 4 is a diagram illustrating optical intensity of the backscattering in the depth direction, which is measured by the first measurement apparatus. The horizontal axis in FIG. 4 represents a depth, and a depth d0 corresponds to a front surface of the measurement target object O. The vertical axis in FIG. 4 represents the optical intensity of the backscattering from the measurement target object O, which is represented by the natural logarithm. Meanwhile, the measurement target object O is, for example, an epithelium of a digestive organ.

If the measurement result in FIG. 4 is subjected to linear fitting, it is found that the measurement target object O has a two-layer structure including an upper layer from the depth d0 to a depth d1 and corresponding to a straight line L1 and a lower layer from the depth d1 to a depth d2 and corresponding to a straight line L2. Further, it is possible to calculate an attenuation coefficient $\mu_{t1}$ of the upper layer from a slope of the straight line L1, and it is possible to calculate an attenuation coefficient $\mu_{t2}$ of a lower layer from a slope of the straight line L2.

Figure 5:
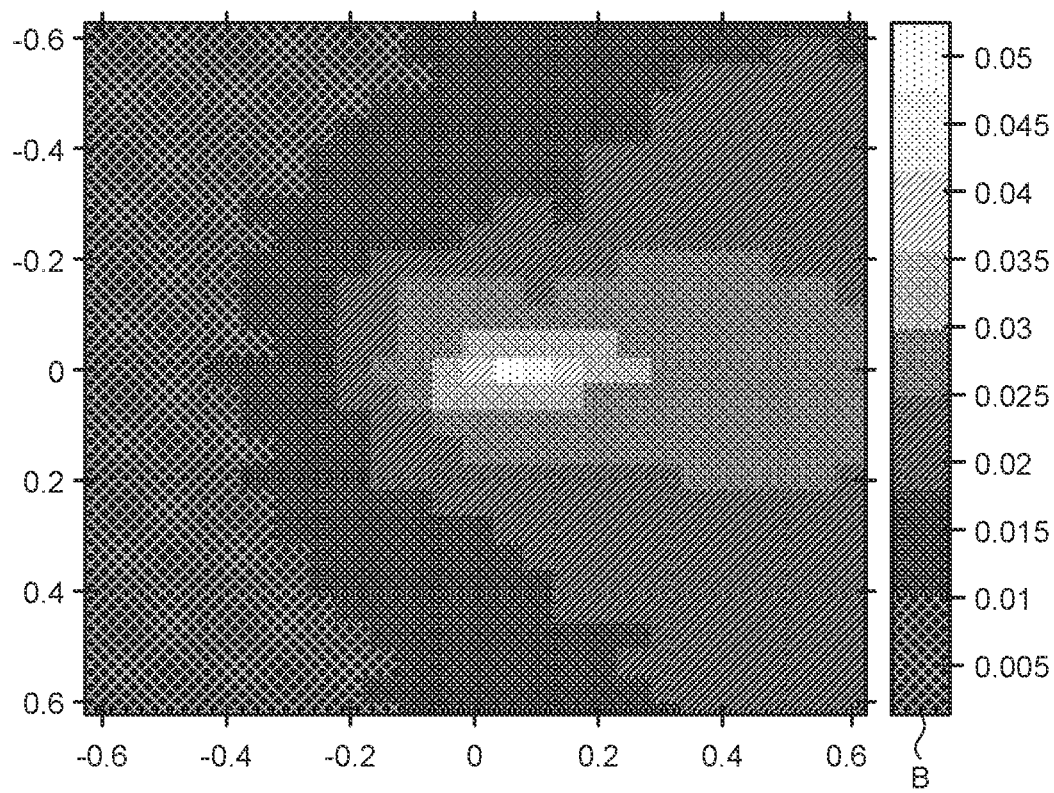
FIG. 5 is a diagram illustrating a two-dimensional optical intensity distribution of the backscattering, which is generated by the second measurement apparatus.

Thereafter, the acquiring unit 41 acquires the measurement result of the second measurement apparatus 3 (Step S3). FIG. 5 is a diagram illustrating a two-dimensional optical intensity distribution of the backscattering on the front surface of the measurement target object O, which is generated by the second measurement apparatus. The second measurement apparatus 3 measures the optical intensity distribution of the backscattering from the measurement target object O, on the front surface of the measurement target object O as illustrated in FIG. 5. An origin of the optical intensity distribution (a position at which numerals on the vertical axis and the horizontal axis in FIG. 5 are zero) corresponds to a position at which the spot light is beamed from the second light source unit 31. Further, a region corresponding to a pattern with a larger numeral on a display bar B illustrated on the right side indicates higher optical intensity. Meanwhile, the second measurement apparatus 3 performs measurement before the process at Step S3 is performed.

Subsequently, the optical property calculation unit 43 fixes the attenuation coefficient to the value calculated by the attenuation coefficient calculation unit 42, and calculates the scattering coefficient and the absorption coefficient in the depth direction of the measurement target object O on the basis of the measurement result of the second measurement apparatus 3 by using the fixed value as a limiting condition (Step S4).

Figure 6:
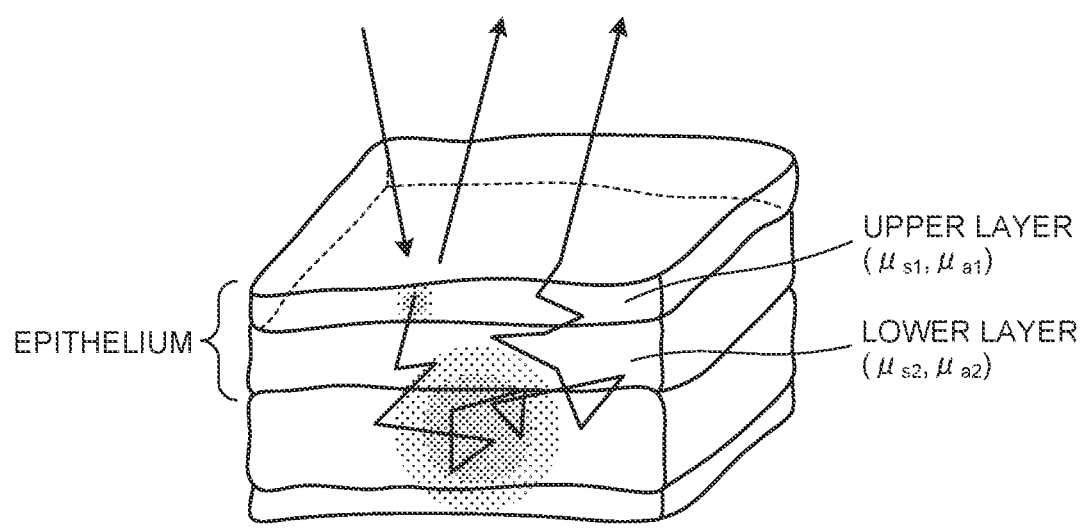
FIG. 6 is a diagram illustrating how light propagates inside a measurement target object.

FIG. 6 is a diagram illustrating a state in which light propagates inside the measurement target object. As illustrated in FIG. 6, the epithelium of the digestive organ as the measurement target object O is formed of an upper layer with a scattering coefficient $\mu_{s1}$ and an absorption coefficient $\mu_{s1}$ and a lower layer with a scattering coefficient $\mu_{s2}$ and an absorption coefficient $\mu_{a2}$. Further, $\mu_{t1}=\mu_{s1}+\mu_{a1}$ and $\mu_{s2}+\mu_{a2}$.

The optical property calculation unit 43 sets the absorption coefficient ($\mu_{a1}$, $\mu_{a2}$) of the measurement target object O as a first variable, sets a difference between the attenuation coefficient ($\mu_{t1}$, $\mu_{t2}$) calculated by the first measurement and the first variable as a second variable ($\mu_{s1}=\mu_{t1}-\mu_{a1}$, $\mu_{s2}=\mu_{t2}=\mu_{a2}$), and generates a plurality of parameter sets of the first variable and the second variable. When generating the plurality of parameter sets, it is preferable to set the first variable based on a range of possible values of the absorption coefficient. It is possible to set a lower limit of the possible values of the absorption coefficient to zero and set an upper limit to an adequately large value on the basis of a well-known absorption coefficient of the measurement target object O.

Figure 7:
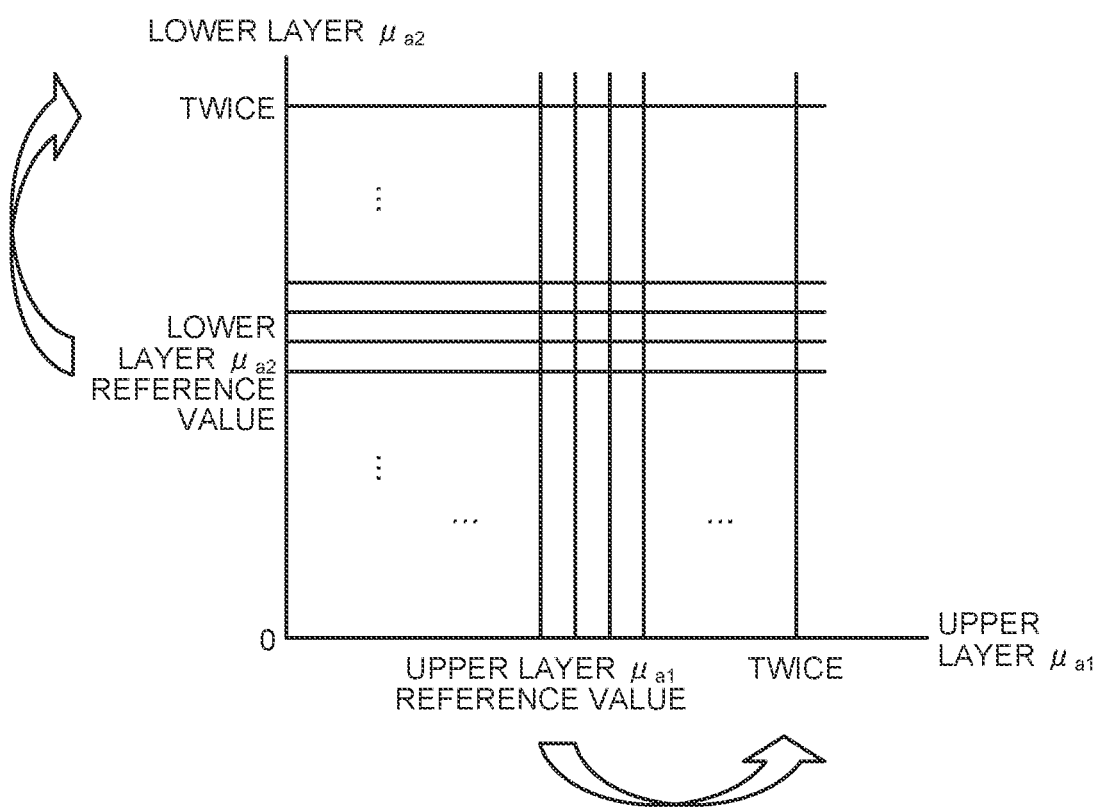
FIG. 7 is a diagram illustrating a state in which a first variable is changed.

FIG. 7 is a diagram illustrating a state in which the first variable is changed. As illustrated in FIG. 7, the first variable is set to zero to twice a reference value of the absorption coefficient (to be described later) on the basis of the range of the possible values of the absorption coefficient, for example. Then, parameter sets in which each of $\mu_{s1}$ and $\mu_{a2}$ as the first variables is changed at predetermined intervals from zero to twice the reference value are generated, and a look-up table including all of the parameter sets is generated.

As a feature of the epithelium, in general, the scattering coefficient is sufficiently large as compared to the absorption coefficient, so that contribution of the scattering coefficient to the attenuation coefficient is dominant. Therefore, if the scattering coefficient is used as the first variable, in some cases, the absorption coefficient may become a negative value and it becomes difficult to increase a variation range of the scattering coefficient, so that it becomes difficult to estimate the absorption coefficient and the scattering coefficient with high accuracy. To cope with this, by using the absorption coefficient as the first variable and changing the first variable in the range of the possible values of the absorption coefficient, it is possible to estimate the absorption coefficient and the scattering coefficient while preventing the absorption coefficient from becoming a negative value and while increasing a change rate of the absorption coefficient. As a result, it is possible to estimate the absorption coefficient and the scattering coefficient with high accuracy. However, even if the scattering coefficient ($\mu_{s1}$, $\mu_{s2}$) is used as the first variable, it is possible to estimate the scattering coefficient and the absorption coefficient. Meanwhile, it is sufficient to set the reference value of the absorption coefficient with reference to a general absorption coefficient of the epithelium at the wavelength at which the measurement is performed.

Subsequently, the optical property calculation unit 43 calculates, with respect to each of the parameter sets in the generated look-up table, an optical intensity distribution of the backscattering on a plane of the front surface of the measurement target object under the same condition as the second measurement, by using the Monte Carlo method. Then, the calculated optical intensity distribution of each of the parameter sets and the optical intensity distribution in the measurement result illustrated in FIG. 5 are compared, and a parameter set with which a square integration error of all of pixels is minimum is selected. Furthermore, the optical property calculation unit 43 adopts the selected parameter set as the scattering coefficient ($\mu_{s1}$, $\mu_{s2}$) and the absorption coefficient ($\mu_{a1}$, $\mu_{a2}$) that change in the depth direction of the measurement target object O.

As described above, according to the embodiment, it is possible to estimate the scattering coefficient and the absorption coefficient of the measurement target object O with high accuracy by combining the two measurement methods, that is, the first measurement and the second measurement. In particular, in the present embodiment, a distribution of an attenuation coefficient of the measurement target object O in the depth direction is obtained by the first measurement, and distributions of a scattering coefficient and an absorption coefficient in the depth direction are obtained by using a result of the second measurement while using a value of the obtained attenuation coefficient as a limiting condition. By setting the value of the attenuation coefficient as the limiting condition, it is possible to reduce the number of variables at the time of obtaining the scattering coefficient and the absorption coefficient, so that it is possible to obtain the distributions of the scattering coefficient and the absorption coefficient in the depth direction with high accuracy as compared to the estimation methods disclosed in Japanese Patent No. 4995055 and Japanese Patent No. 4038179.

First Modification

In a first modification, the optical property calculation unit 43 calculates a scattering coefficient and an absorption coefficient with which a difference between an optical intensity distribution of backscattering from the measurement target object O on a plane of the front surface of the measurement target object O, which is calculated by analyzing light propagation inside the measurement target object O, and an optical intensity distribution of backscattering from the measurement target object O on the plane of the front surface of the measurement target object O, which is measured by the second measurement, is minimized. As a method of analyzing the light propagation inside the measurement target object O, an optical transport equation, a method of calculating the light propagation using a diffusion approximate equation, a method of stochastically tracing light beams by using the Monte Carlo method, or the like may be adopted. Furthermore, as a method of selecting (optimizing) an optimal parameter set, the Newton's method, the method of Lagrange multiplier, or the like may be adopted.

Second Modification

In a second modification, the second measurement is measurement of an optical intensity distribution of backscattering from the measurement target object O on the front surface of the measurement target object O by controlling polarization of light that incident on the measurement target object O and polarization of the backscattering from the measurement target object O. Specifically, as the second measurement, an optical intensity distribution of the backscattering is measured in a state in which polarization of light that incident on the measurement target object O and polarization of the backscattering from the measurement target object O are observed with crossed nicols and parallel nicols, and a scattering coefficient is calculated by using a method described in Andreas H. Hielscher, et al., "Influence of particle size and concentration on the diffuse backscattering of polarized light from tissue phantoms and biological cell suspensions", 1 Jan. 1997, y Vol. 36, No. 1 y APPLIED OPTICS. Furthermore, it is possible to obtain an absorption coefficient by subtracting the scattering coefficient from the attenuation coefficient that is obtained by the first measurement.

Third Modification

In a third modification, the optical property calculation unit 43 calculates a g parameter that is an anisotropic scattering parameter in the depth direction of the measurement target object O, on the basis of the scattering coefficient in the depth direction of the measurement target object O and wavelength dependency of backscattering coefficient μb from the measurement target object O measured by the first measurement. Specifically, the optical property calculation unit 43 first fixes the g parameter to an appropriate value, and calculates the scattering coefficient in the depth direction by inverse analysis or the like. Subsequently, the g parameter is calculated from the calculated scattering coefficient and the wavelength dependency of the backscattering coefficient μb measured by the first measurement, by using a method described in J. Yi, et al., "Spatially resolved optical and ultrastructural properties of colorectal and pancreatic field carcinogenesis observed by inverse spectroscopic optical coherence tomography" J. Biomed. Opt. 19 (3), 036013 (2014). Meanwhile, the optical property calculation unit 43 may increase accuracy of the calculated g parameter by repeating the above-described calculation. Furthermore, the optical property calculation unit 43 may assume that the absorption coefficient is sufficiently small as compared to the scattering coefficient, and calculate the g parameter by assuming the attenuation coefficient obtained by the first measurement as the scattering coefficient.

Meanwhile, in the embodiment as described above, the example has been described in which the first measurement is interference measurement, but embodiments are not limited to this example. The first measurement may be time-resolved measurement, polarization measurement, or pattern projection measurement. In the time-resolved measurement, it is possible to obtain information on the depth direction of the measurement target object O from a temporal change of optical intensity of backscattering from. the measurement target object O when pulse or intensity-modulated light is beamed to the measurement target object O. In the polarization measurement, is possible to obtain information on a shallow portion and a deep portion by controlling polarization of light that incident on the measurement target object O and polarization of backscattering from the measurement target object O. Furthermore, in the pattern projection measurement, it is possible to obtain information on the depth direction because a frequency characteristic of a stripe pattern and a depth of the measurement target object O (a scattering object, such as a living body) correspond to each other. In this manner, the first measurement is riot specifically limited as long as is possible to obtain, by a measurement method, information on the depth direction of the measurement target object O.

Moreover, in the embodiment as described above, the example has been described in which the spot light is beamed to the measurement target object O as the second measurement, but embodiments are not limited to this example. The second measurement may be time-resolved measurement, polarization measurement, or pattern projection measurement. In the time-resolved measurement, it is possible to separate the scattering coefficient and the absorption coefficient on the basis of a feature of an impulse response or a phase shifting with respect to intensity-modulated light. In the polarization measurement, it is possible to separate polarization-dependent scattering and polarization-independent absorption by controlling polarization of light that incident on the measurement target object O and polarization of backscattering from the measurement target object O. In the pattern projection measurement, it is possible to obtain the scattering coefficient and the absorption coefficient by performing optimization from pattern projected images of a plurality of frequency patterns. In this manner, the second measurement is not specifically limited as long as it is possible to separate, by a measurement method, the scattering coefficient and the absorption coefficient.

Furthermore, if the first measurement is performed on a different area of the measurement target object O, it is possible to obtain a distribution of an attenuation coefficient of the area in a depth direction of the area, so that it is possible to obtain a three-dimensional distribution of a scattering coefficient and an absorption coefficient of the measurement target object O by using the obtained value.

According to the present disclosure, it is possible to realize an optical property measurement method and an optical property calculation apparatus capable of estimating a scattering coefficient and an absorption coefficient inside a measurement target object with high accuracy.

Additional advantages and modifications will readily occur to those skilled in the art. Therefore, the disclosure in its broader formation is not limited to the specific details and representative embodiments shown and described herein. Accordingly, various modifications may be made without departing from the spirit or scope of the general inventive concept as defined by the appended claims and their equivalents.

What is claimed is:

1. An optical property measurement method comprising:
performing a first measurement by beaming, by a first light source, light to a measurement target object, the measurement target object being a living body or a pseudo living body, and measuring, by a first light sensor, intensity of backscattering from the measurement target object when light is beamed to the measurement target object from the first light source;
calculating, by one or more processors comprising hardware, an attenuation coefficient in a depth direction of the measurement target object based on the intensity of the backscattering measured by the first measurement;
performing a second measurement by beaming, by a second light source, light to the measurement target object, and measuring, by a second light sensor, intensity of backscattering from the measurement target object when light is beamed to the measurement target object from the first light source;
calculating, by the one or more processors, a scattering coefficient and an absorption coefficient in the depth direction of the measurement target object based on the intensity of backscattering by using a value of the attenuation coefficient as a limiting condition;
setting, by the one or more processors, the scattering coefficient or the absorption coefficient of the measurement target object as a first variable;
setting, by the one or more processors, a difference between the attenuation coefficient and the first variable as a second variable;
generating, by the one or more processors, a plurality of parameter sets of the first variable and the second variable;
calculating, by the one or more processors, by using the plurality of parameter sets, a first optical intensity distribution that is an optical intensity distribution of the backscattering from the measurement target object on a plane of a front surface of the measurement target object;
measuring, by the second light sensor, a second optical intensity distribution that is an optical intensity distribution of the backscattering from the measurement target object on the front surface of the measurement target object;
selecting, by the one or more processors, a parameter set of the plurality of parameter sets with which a difference between a first optical intensity distribution and a second optical intensity distribution is minimized; and
adopting, by the one or more processors, the parameter set selected as a scattering coefficient and an absorption coefficient in the depth direction of the measurement target object.

2. The optical property measurement method according to claim 1,
wherein the first variable is the absorption coefficient of the measurement target object, and
wherein the first variable is determined based on a range of assumed values of an absorption coefficient of the measurement target object when the plurality of parameter sets are generated.

3. The optical property measurement method according to claim 1, wherein the first measurement or the second measurement is to measure the backscattering from the measurement target object by performing scanning on the front surface of the measurement target object.

4. The optical property measurement method according to claim 1, wherein the first measurement is one of interference measurement, time-resolved measurement, polarization measurement, and pattern projection measurement.

5. The optical property measurement method according to claim 1, wherein the second measurement is one of measurement by beaming spot light, time-resolved measurement, polarization measurement, and pattern projection measurement.

6. The optical property measurement method according to claim 1, wherein the second measurement is to measure an optical intensity distribution of the backscattering from the measurement target object on a front surface of the measurement target object.

7. The optical property measurement method according to claim 1, further comprising:
generating, by the one or more processors, a look-up table of the second variable and the first variable that is obtained by setting to plurality of different value in a predetermined range; and
selecting, by the one or more processors, the first variable and the second variable with which a difference between the second optical intensity distribution and the first optical intensity distribution that is calculated in accordance with the generated look-up table is minimized.

8. The optical property measurement method according to claim 1, further comprising:
analyzing, by the one or more processors, light propagation inside the measurement target object, to calculate a first optical intensity distribution that is an optical intensity distribution of the backscattering from the measurement target object on a plane of the front surface of the measurement target object;
performing the second measurement to measure, by the second light sensor, a second optical intensity distribution that is an optical intensity distribution of the backscattering from the measurement target object on the front surface of the measurement target object; and
calculating, by the one or more processors, the scattering coefficient and the absorption coefficient with which a difference between the first optical intensity distribution and the second optical intensity distribution is minimized.

9. The optical property measurement method according to claim 1, wherein performing the second measurement comprises measuring, by an optical intensity distribution of the backscattering from the measurement target object on a front surface of the measurement target object, by controlling polarization of light that incident on the measurement target object and polarization of the backscattering from the measurement target object.

10. The optical property measurement method according to claim 1, further comprising:
calculating, by the one or more processors, an anisotropic scattering parameter in the depth direction of the measurement target object based on the scattering coefficient in the depth direction of the measurement target object and on wavelength dependency of the intensity of the backscattering from the measurement target object measured by the first measurement.

11. An optical property calculation apparatus comprising a processor comprising hardware, the processor being configured to:
perform a first measurement by controlling a first light source to beam light to a measurement target object, the measurement target object being a living body or a pseudo living body, and controlling a first light sensor to measure intensity of backscattering from the measurement target object when light is beamed to the measurement target object from the first light source;
calculate an attenuation coefficient in a depth direction of the measurement target object based on the intensity of the backscattering measured by the first measurement;
perform a second measurement by controlling a second light source to beam light to the measurement target object and controlling a second light sensor to measure intensity of backscattering from the measurement target object when light is beamed to the measurement target object from the first light source;
calculate a scattering coefficient and an absorption coefficient in the depth direction of the measurement target object based on the intensity of backscattering by using a value of the attenuation coefficient as a limiting condition;
set the scattering coefficient or the absorption coefficient of the measurement target object as a first variable;
set a difference between the attenuation coefficient and the first variable as a second variable;
generate a plurality of parameter sets of the first variable and the second variable;
calculate, by using the plurality of parameter sets, a first optical intensity distribution that is an optical intensity distribution of the backscattering from the measurement target object on a plane of a front surface of the measurement target object;
control the second light sensor to measure a second optical intensity distribution that is an optical intensity distribution of the backscattering from the measurement target object on the front surface of the measurement target object;
select a parameter set of the plurality of parameter sets with which a difference between a first optical intensity distribution and a second optical intensity distribution is minimized; and
adopt the parameter set selected as a scattering coefficient and an absorption coefficient in the depth direction of the measurement target object.

* * * * *